United States Patent
Tsui

(10) Patent No.: US 7,181,220 B2
(45) Date of Patent: Feb. 20, 2007

(54) SEAMLESS ROAMING APPARATUS, SYSTEMS, AND METHODS

(75) Inventor: Ernest Tsui, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 229 days.

(21) Appl. No.: 10/669,235

(22) Filed: Sep. 24, 2003

(65) Prior Publication Data

US 2005/0063338 A1  Mar. 24, 2005

(51) Int. Cl.
*H04Q 7/20* (2006.01)
*H04Q 7/00* (2006.01)

(52) U.S. Cl. ............... 455/436; 455/437; 370/331

(58) Field of Classification Search ........ 455/436–444, 455/432.1, 435.2; 370/331, 332, 335
See application file for complete search history.

(56) References Cited

U.S. PATENT DOCUMENTS

| | | | |
|---|---|---|---|
| 5,109,390 A * | 4/1992 | Gilhousen et al. | 370/335 |
| 5,490,165 A | 2/1996 | Blakeney, II et al. | |
| 5,848,063 A * | 12/1998 | Weaver et al. | 370/331 |
| 6,061,336 A * | 5/2000 | Baker | 370/320 |
| 6,161,013 A * | 12/2000 | Anderson et al. | 455/437 |
| 6,483,826 B1 * | 11/2002 | .ANG.kerberg | 370/335 |
| 6,526,090 B1 * | 2/2003 | Papasakellariou | 375/136 |
| 6,606,485 B1 * | 8/2003 | Chen et al. | 455/140 |
| 6,628,631 B1 * | 9/2003 | Mazawa et al. | 370/331 |
| 6,754,497 B1 * | 6/2004 | Ozluturk | 455/437 |
| 7,054,397 B1 * | 5/2006 | Kawanabe | 375/347 |
| 2001/0028674 A1 * | 10/2001 | Edlis et al. | 375/130 |
| 2002/0082038 A1 * | 6/2002 | Mochizuki | 455/522 |
| 2002/0196754 A1 * | 12/2002 | Lugil et al. | 370/335 |
| 2004/0023669 A1 * | 2/2004 | Reddy | 455/456.1 |
| 2004/0071113 A1 * | 4/2004 | Tiedemann, Jr. | 370/331 |
| 2004/0264410 A1 * | 12/2004 | Sagi et al. | 370/331 |
| 2004/0266474 A1 * | 12/2004 | Petrus | 455/436 |
| 2005/0009523 A1 * | 1/2005 | Pekonen | 455/436 |
| 2005/0059400 A1 * | 3/2005 | Jagadeesan et al. | 455/436 |

* cited by examiner

*Primary Examiner*—Lester G. Kincaid
*Assistant Examiner*—Marivelisse Santiago-Cordero
(74) *Attorney, Agent, or Firm*—Schwegman, Lundberg, Woessner & Kluth, P.A.

(57) ABSTRACT

An apparatus and a system, as well as a method and article, may operate to search for a benefit associated with switching from receiving first information from a first network to receiving second information from a second network, and downloading a demodulation code to demodulate the second information received from the second network.

28 Claims, 4 Drawing Sheets

SEAMLESS ROAMING APPARATUS, SYSTEMS, AND METHODS

TECHNICAL FIELD

Various embodiments described herein relate to communication generally, including apparatus, systems, and methods used to communicate information via networks.

BACKGROUND INFORMATION

In a number of geographic locations, one or more networks are available for use by wireless computing platform users. Ideally, user communications should be conducted in a seamless fashion, even when a connection is initiated on one network and completed on another network. For example, a mobile user may begin communication using a wide area network (WAN) and move to a location where only a wireless local area networks (WLAN) is available. During the transition from the WAN to the WLAN, signal strength may degrade, and the connection may be lost.

DETAILED DESCRIPTION

To assist in providing a high quality connection to various networks as a wireless computing platform moves between them, some embodiments may include a searching receiver comprising a separate physical receiver, or a multiplexed function of the regular network receiver. The searching receiver may not necessarily need a modem for demodulation purposes. In use, as the wireless computing platform moves between networks, the searching receiver may operate to provide a substantially continuous indication of the best available network connection by detecting available network types, determining the benefit of switching to one of the available networks from a currently-connected network, and providing an indication when switching is desirable. Such activity may provide consistently better network connections for wireless computing platforms, as well as the appearance of a seamless transition between networks.

Figure 1:
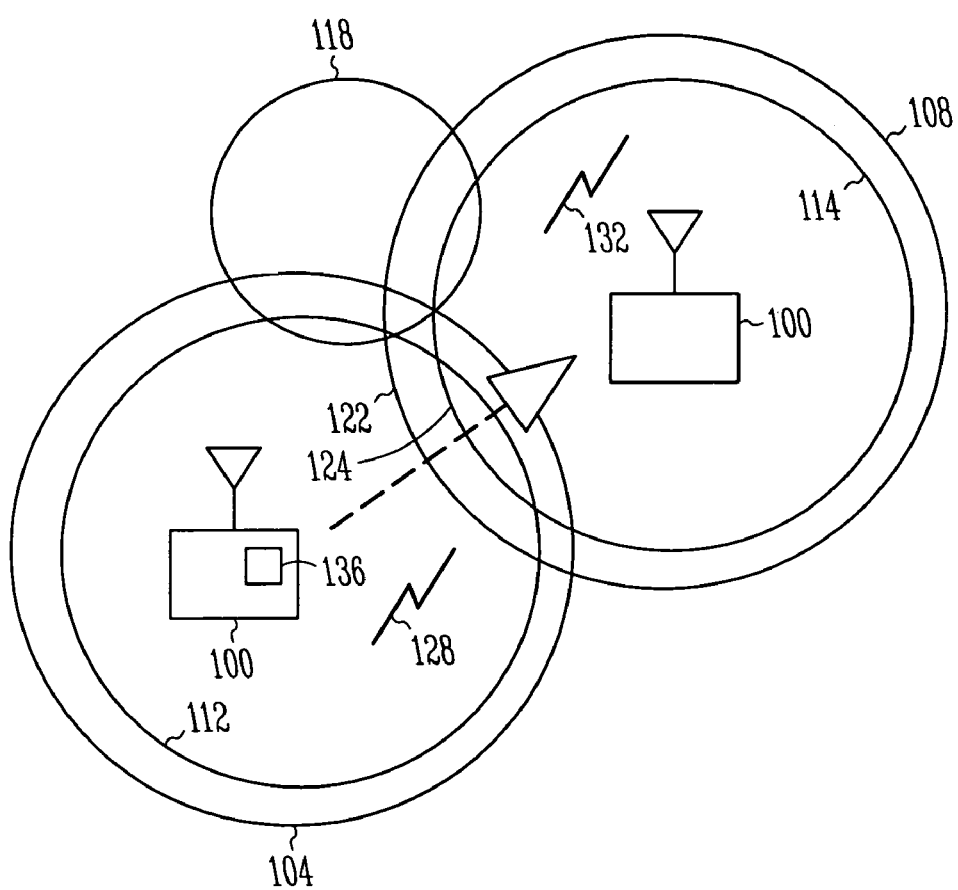
FIG. 1 is a block diagram of a wireless computing platform moving between networks according to various embodiments.

FIG. 1 is a block diagram of a wireless computing platform 100 moving between networks according to various embodiments. For example, the wireless computing platform 100 may move from connecting to a first network 104 (e.g., WAN (Wireless Area Network), WLAN (Wireless Local Area Network), WPAN (Wireless Personal Area Network), etc.) to a second network 108 (e.g., WAN, WLAN, WPAN, etc.). The first network 104 may include one or more connections associated with a first benefit 112 and/or a second benefit 114, among others. A third network 118 may also offer connections to the platform 100 as the platform 100 moves from the first network 104 toward the second network 108. As the transition between the networks 104, 108 is made, there may be areas 122, 124 where the networks 104, 108 and the first and second benefits 112, 114 overlap, respectively.

While the platform 100 moves between the networks 104, 108, it may be difficult to detect a better connection to any of the networks 104, 108, or 118. In fact, as movement occurs and one of the networks begins to lose signal strength (or incurs significant degrading interference), the platform 100 user may lose one or both connections 128, 132 due to weak signals from the first and second networks 104, 108, respectively.

Thus, in the intersecting area 122, the loss of a network connection can occur suddenly and without warning, such that the appearance of seamless roaming will be lost unless a new network (e.g., network 118) can be found. Several embodiments provide a mechanism to accomplish this goal. Essentially, using the searching receiver approach, most available networks can be detected and classified to assist in providing a high quality connection.

In some embodiments, an extra receiver or search receiver 136 is introduced. For example, if there are two currently operative network connections, a third receiver (or for N receivers operating in conjunction with N connections, an N+1 receiver) may be used. The search receiver 136 may provide one or more indications of a beneficial network connection N+1 before any of the currently operative N connections are lost. This approach avoids losing all network connections 128, 132 as the mobile client exits the two WLAN and WAN network coverage areas by first attempting to find a third network 118 while the platform 100 is still connected to the first and second networks 104, 108. In some embodiments, including those comprising reconfigurable radios, the search receiver 136 may comprise a beacon detection circuit and software processing to detect the type of network that is available. In some embodiments, determining the presence of an available network by measuring channel characteristics such as multipath strength, SNR, etc. may take only a few milliseconds.

In various embodiments, the search receiver 136 may be implemented as a virtual or "logical" receiver activated when there is a dead time in the regular network receiver used in the platform 100. However, in some embodiments, whether the search receiver 136 takes the form of a separate physical receiver, or a virtual, multiplexed receiver, a signal processor can be used in conjunction with the search receiver 136 to determine relevant signal and network characteristics, such as determining that one of the N receivers can be re-tasked to lock on to a newly detected network at the appropriate time.

Figure 2:
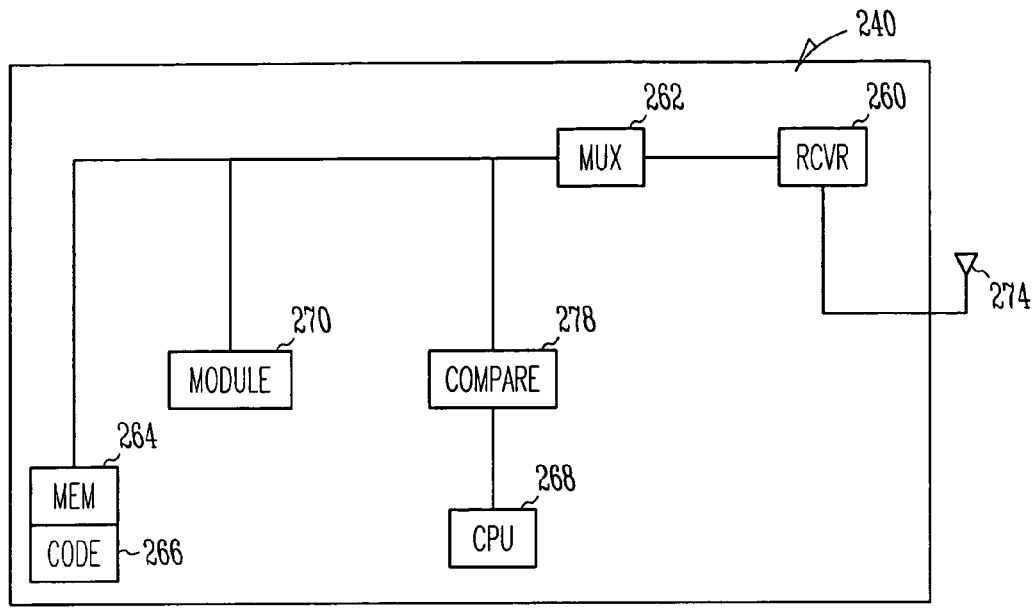
FIG. 2 is a block diagram of a multiplexed search receiver apparatus and system according to various embodiments.
Figure 3:
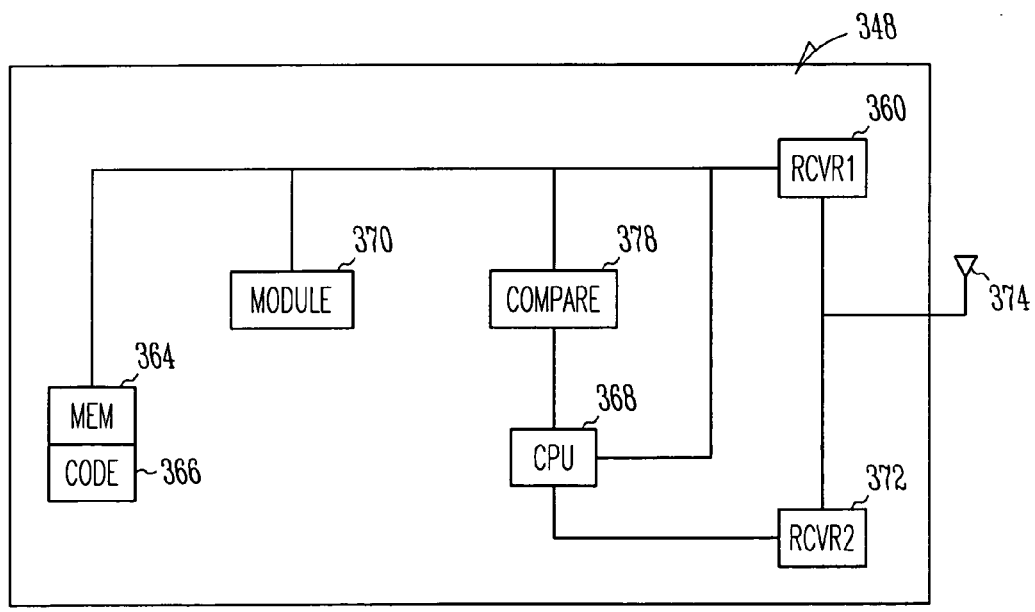
FIG. 3 is a block diagram of a dedicated search receiver apparatus and system according to various embodiments.

FIG. 2 is a block diagram of a multiplexed search receiver apparatus 240 and system 244 according to various embodiments. FIG. 3 is a block diagram of a dedicated search receiver apparatus 348 and system 352 according to various embodiments. In some embodiments, an apparatus 240, 348 may comprise a receiver 260, 360 to search for a benefit associated with switching from receiving first information from a first network to receiving second information from a second network (see FIG. 1, elements 104, 108). The apparatus 240, 348 may form part of a wireless computing platform (see FIG. 1).

Benefits associated with particular connections (e.g., elements 128, 132 in FIG. 1) may be compared and ranked according to some value, selected by the user of the wireless computation platform, a network administrator, or an internet service provider (ISP), among others. The value of a particular benefit sought by the receiver 260, 360 may be associated with many connection attributes, including one or more of: a network type, a network capability, a network activity level, a signal strength, a quality of service, a bandwidth, a signal-to-noise ratio, a signal-to-interference ratio, a multipath condition, a favored service provider, a monetary cost, user-preferred information, and a user-preferred service. Benefits may also be ranked according to better receive and/or transmit capabilities with respect to the wireless computation platform, the first and second networks, or both.

The first and second information (e.g., data received by the wireless computing platform when connected to the first and second networks, respectively), as well as the information type associated with the first and second information, may be the same, or different. For example, a wireless computing platform may be connected to a WAN using one protocol (e.g., a first information type), and switch to a WLAN using another protocol (e.g., a second information type). However, the first and second information may comprise search results from a single networked search engine. In this case, the first information and the second information may be the same, or a continuation of one another, while the information type associated with the first and second information (i.e., the protocols) may be different. Alternatively, a wireless computing platform may be connected to a first WLAN using a wireless protocol, and then, due to increasing signal strength or bandwidth allowances, switch to a second WLAN using the same wireless protocol. However, the first and second information may comprise, for the first WLAN, search engine results, and for the second WLAN, a web site linked to the search engine results. In this case, the first and second information are different, but the information types (i.e., protocols) associated with the information, are the same.

The apparatus 240, 348 may include a module 264, 364 (e.g., a memory, a processor, circuitry, and/or programmed instructions) to receive, download, and/or store a code 266, 366, such as a modulation and/or demodulation code, which can be used to modulate/demodulate information, such as the second information, including a new or different protocol. The apparatus 240, 348 may also include a processor 268, 368 to couple to the receiver 260, 360 and to the module 264, 364 used to receive, download, and/or store the code 266, 366.

The apparatus 240, 348 may include a module 270, 370, such as a modulator, demodulator, or both, perhaps comprising a signal processor, operated by accessing the code 266, 366. As shown in FIG. 2, the receiver 260 may comprise a multiplexed receiver coupled to a multiplexer 262 to couple the processor 268 to one or more networks (e.g., the first, second, and third networks shown in FIG. 1 as elements 104, 108, and 118, respectively). Alternatively, as shown in FIG. 3, the apparatus 348 may comprise a second receiver 372 to couple the processor 368 to one or more networks.

In another embodiment, a system 244, 352 may comprise the apparatus 240, 348 described previously, as well as an antenna 274, 374 to couple to the receiver 260, 360. The antenna 274, 374 may be a monopole, a dipole, an omnidirectional antenna, or a patch antenna, among others. The system 244, 352 may include a comparison module 278, 378 coupled to the receiver 260, 360 to determine and compare the value of the benefit sought by the receiver 260, 360. In some embodiments, the system 352 may include a second receiver 372 to couple the processor 368 to one or more networks.

Referring now to FIGS. 1, 2, and 3, it should be noted that the wireless computing platform 100 may include one or more of the multiplexed search receiver apparatus 240, and/or one or more of the dedicated search receiver apparatus 348. The wireless computing platform 100 may also include one or more of the systems 244, and/or the systems 352.

The wireless computing platform 100, networks 104, 108, 118, benefits 112, 114, areas 122, 124, connections 128, 132, search receiver 136, multiplexed search receiver apparatus 240, system 244, dedicated search receiver apparatus 348, system 352, receivers 260, 360, modules 264, 364, codes 266, 366, processors 268, 368, modules 270, 370, receiver 372, antennas 274, 374, and comparison modules 278, 378 may all be characterized as "modules" herein. Such modules may include hardware circuitry, and/or one or more processors and/or memory circuits, software program modules, including objects and collections of objects, and/or firmware, and combinations thereof, as desired by the architect of the platform 100, apparatus 240, 348, and systems 244, 352, and as appropriate for particular implementations of various embodiments.

It should also be understood that the apparatus and systems of various embodiments can be used in applications other than for wireless computing platforms, and other than for migration between WAN and WLAN networks, and thus, various embodiments are not to be so limited. The illustrations of a platform 100, apparatus 240, 348, and systems 244, 352 are intended to provide a general understanding of the structure of various embodiments, and they are not intended to serve as a complete description of all the elements and features of apparatus and systems that might make use of the structures described herein.

Applications which may include the novel apparatus and systems of various embodiments include, but are not limited to, electronic circuitry used in high-speed computers, communication and signal processing circuitry, modems, processor modules, embedded processors, and application-specific modules, including multilayer, multi-chip modules. Such apparatus and systems may further be included as sub-components within a variety of electronic systems, such as televisions, cellular telephones, personal computers, workstations, radios, video players, vehicles, and others.

Figure 4:
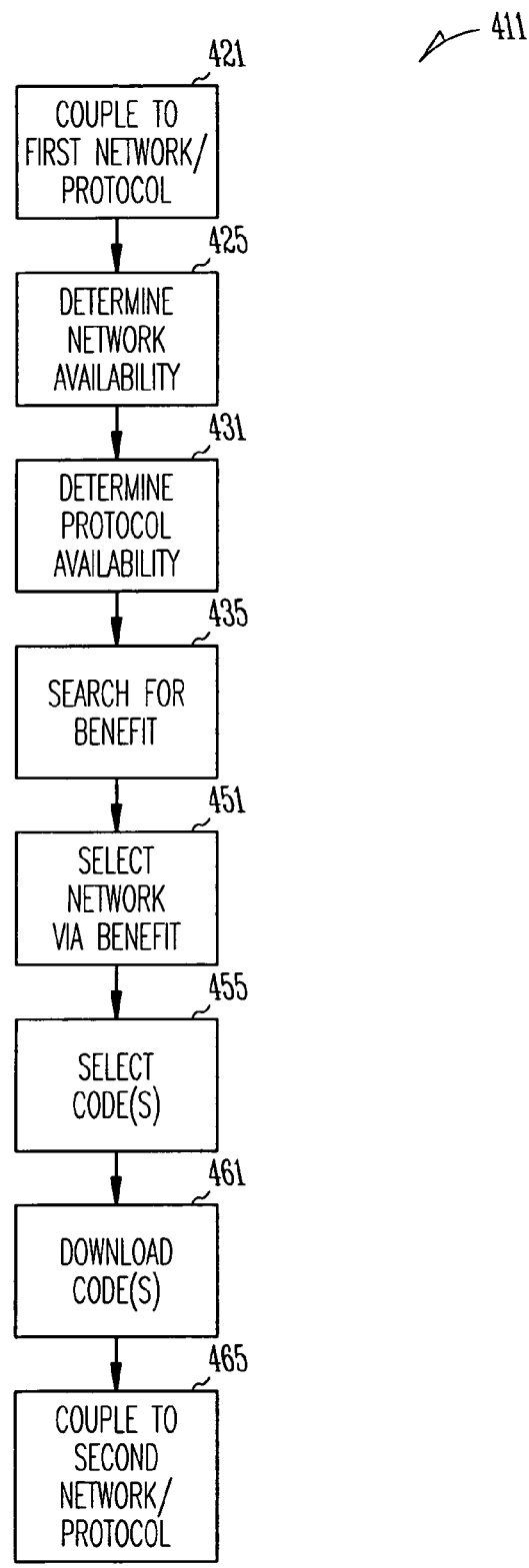
FIG. 4 is a flow chart illustrating several methods according to various embodiments.

FIG. 4 is a flow chart illustrating several methods according to various embodiments. A method 411 may (optionally) begin with coupling a device, such as a wireless computing platform, to a first network (and/or protocol) to receive first information at block 421. The method 411 may continue at block 425 with determining the existence and availability of a second network at the device. This activity may include, for example, determining which of a plurality of networks including the second network is available to transmit the second information. This activity may also include determining the existence of all available networks including the second network.

Determining the existence/availability of networks may also include determining the existence of a second protocol using a second receiver, and coupling the device to the first protocol using a first receiver (e.g., a dedicated search receiver approach). Alternatively, this activity may include coupling the device to the first protocol using a multiplexed receiver, and determining the existence of the second protocol using the multiplexed receiver (e.g., a multiplexed receiver approach). Thus, the method 411 may also include determining the existence and availability of a second protocol, perhaps associated with the second network, at the device at block 431.

The method may continue at block 435 with searching for a benefit associated with a connection obtained by switching from receiving first information from the first network to receiving second information from the second network. This activity may include determining the value of the benefit associated with coupling the device to the second protocol and decoupling the device from the first protocol. The method 411 may include selecting a network via the value of the benefit associated with the connection at block 451.

As noted previously, the value of a particular benefit may be associated with many connection attributes, selected from one or more of: a faster network type, an improved network capability, a reduced network activity level, an improved signal strength, an improved quality of service, an improved bandwidth, an improved signal-to-noise ratio, an improved signal-to-interference ratio, an improved multipath condition, a favored service provider, a reduced monetary cost, user-preferred information, and a user-preferred service. The benefit may even be selected in accordance with a relationship between network administrators, ISPs, and/or one or more users, including a pecuniary relationship.

If necessary, the method 411 may include selecting a modulation and/or demodulation code from a plurality of codes at block 455, and receiving, downloading, and/or storing the selected modulation and/or demodulation code to modulate/demodulate information, including the second information received from the second network at block 461. This activity may include downloading to the device (perhaps including receiving and storing) a modulation or demodulation code associated with a second protocol. The modulation code may be associated with or complement the demodulation code, such that information modulated using the modulation code may be demodulated into its original form using the associated demodulation code. The method 411 may include coupling the device to the second protocol at block 465.

As noted previously, the second information may be a continuation of the first information, such as when the results of a search engine are received from both the first network and the second network. The first and second protocols may both be included in the first network, the second network, or both networks. In addition, the first protocol may be exclusive to the first network, and the second protocol may be exclusive to the second network, and various embodiments are not to be so limited. For example, the first network may comprise a WAN, and the second network may comprise a WLAN.

Similarly, if a dedicated receiver approach is used, the regular network receiver (e.g., see element 372 in FIG. 3) may operate on a first frequency band forming a subset of a second frequency band utilized by the search receiver (e.g., element 360 in FIG. 3). It may be the case that the search receiver can acquire sufficient information to select a needed modulation and/or demodulation code without solicitation (i.e., making any specific query to or about the second network and/or protocol and/or information).

It should be noted that the methods described herein do not have to be executed in the order described, or in any particular order. Moreover, various activities described with respect to the methods identified herein can be executed in serial or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well-known to those skilled in the art, such as application program interfaces or interprocess communication techniques, including remote procedure calls. The teachings of various embodiments of the present invention are not limited to any particular programming language or environment, including Hypertext Markup Language (HTML) and Extensible Markup Language (XML).

Figure 5:
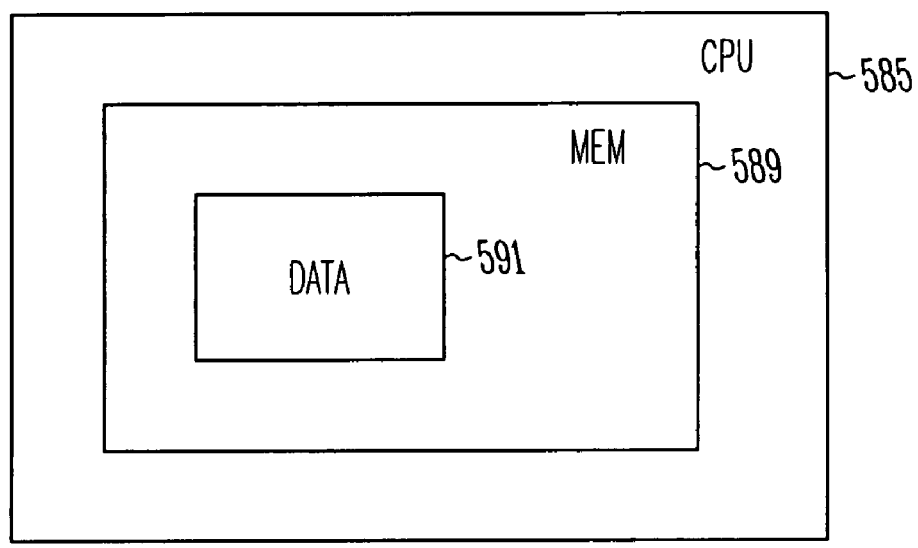
FIG. 5 is a block diagram of an article according to various embodiments.

Thus, other embodiments may be realized. For example, FIG. 5 is a block diagram of an article 585 according to various embodiments, such as a computer, a wireless computing platform, a memory system, a magnetic or optical disk, some other storage device, and/or any type of electronic device or system. The article 585 may comprise a machine-accessible medium such as a memory 589 (e.g., a memory including an electrical, optical, or electromagnetic conductor) having associated data 591 (e.g., computer program instructions), which when accessed, results in a machine performing such actions as searching for a benefit associated with switching from receiving first information from a first network to receiving second information from a second network, and downloading (to include receiving and/or storing) a modulation and/or demodulation code to modulate/demodulate information, including the second information received from the second network. Benefits may be selected and valued as described above. Other activities may include determining the existence of all available networks including the second network, and selecting the demodulation code from a plurality of codes.

Improved network connection quality may result from implementing the apparatus, systems, and methods disclosed herein. The time spent by users in attempting to determine the availability of, and the possibility of access to such networks, as well as frustration involved in losing active connections may thus be reduced.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A method, comprising:
searching for a benefit associated with switching from receiving first information from a first network to receiving second information from a second network;
using one of a dedicated search receiver and a multiplexed search receiver to measure channel characteristics associated with the second network and the benefit; and
downloading a demodulation code to direct operations of a signal processor to demodulate the second information received from the second network upon receiving an indication of a beneficial connection.

2. The method of claim 1, wherein the second information is a continuation of the first information.

3. The method of claim 1, further comprising:
selecting the demodulation code from a plurality of codes.

4. The method of claim 1, further comprising:
determining which of a plurality of networks including the second network is available to transmit the second information.

5. The method of claim 1, further comprising:
selecting a modulation code associated with the demodulation code; and downloading the modulation code.

6. A method comprising:
determining the existence of a second protocol at a device communicatively coupled to a first protocol;
determining a benefit associated with communicatively coupling the device to the second protocol and decoupling the device from the first protocol; and
downloading to the device a demodulation code to direct operations of a signal processor to demodulate information associated with the second protocol, wherein the device includes one of a dedicated search receiver and a multiplexed search receiver to measure channel characteristics associated with the benefit, and wherein the downloading occurs upon receiving an indication of a beneficial connection.

7. The method of claim 6, wherein the first protocol and the second protocol are included in a single network.

8. The method of claim 6, wherein the first protocol is included in a first network, and wherein the second protocol is included in a second network.

9. The method of claim 8, wherein the first network comprises a wide area network, and wherein the second network comprises a wireless local area network.

10. The method of claim 6, further comprising: determining the existence of the second protocol using a second receiver comprising the dedicated search receiver; and coupling the device to the first protocol using a first receiver.

11. The method of claim 10, wherein the first receiver operates on a first frequency band forming a subset of a second frequency band utilized by the second receiver.

12. The method of claim 10, wherein the second receiver acquires sufficient information to select the demodulation code without solicitation.

13. The method of claim 6, further comprising:
coupling the device to the first protocol using the multiplexed receiver; and
determining the existence of the second protocol using the multiplexed receiver.

14. The method of claim 6, further comprising:
selecting a modulation code associated with the demodulation code; and
downloading the modulation code.

15. An article comprising a machine-accessible medium having associated data, wherein the data, when accessed, results in a machine performing:
searching for a benefit associated with switching from receiving first information from a first network to receiving second information from a second network;
using one of a dedicated search receiver and a multiplexed search receiver to measure channel characteristics associated with the second network and the benefit; and
downloading a demodulation code to direct operations of a signal processor to demodulate the second information received from the second network upon receiving an indication of a beneficial connection.

16. The article of claim 15, wherein the data, when accessed, results in the machine performing:
determining the existence of all available networks including the second network; and selecting the demodulation code from a plurality of codes.

17. The article of claim 15, wherein a value of the benefit is associated with at least one of a network type, a network capability, a network activity level, a signal strength, a quality of service, a bandwidth, a signal-to-noise ratio, a signal-to-interference ratio, a multipath condition, a service provider, a monetary cost, user-preferred information, and a user-preferred service.

18. The article of claim 15, wherein the data, when accessed, results in the machine performing:
selecting the benefit according to a pecuniary relationship.

19. The article of claim 15, wherein the data, when accessed, results in the machine performing:
selecting a modulation code associated with the demodulation code; and
downloading the modulation code.

20. An apparatus, comprising:
a receiver to search for a benefit associated with switching from receiving first information from a first network to receiving second information from a second network, the receiver comprising one of a dedicated search receiver and a multiplexed search receiver to measure channel characteristics associated with the second network and the benefit;
a module to download a demodulation code to demodulate the second information upon receiving an indication of a beneficial connection; and
a signal processor to couple to the receiver and to the module to download the demodulation code, wherein the demodulation code is to direct operations of the signal processor to demodulate the second information.

21. The apparatus of claim 20, wherein the apparatus further comprises:
   a demodulator comprising the signal processor operated by accessing the demodulation code.

22. The apparatus of claim 20, wherein the receiver comprises the multiplexed receiver to couple the processor to the first network and the second network.

23. The apparatus of claim 20, further comprising:
   a second receiver comprising the dedicated search receiver to couple the processor to the first network and to the second network.

24. A system, comprising:
   a receiver to search for a benefit associated with switching from receiving first information from a first network to receiving second information from a second network, the receiver comprising one of a dedicated search receiver and a multiplexed search receiver to measure channel characteristics associated with the second network and the benefit;
   a module to download a demodulation code to demodulate the second information upon receiving an indication of a beneficial connection;
   a signal processor to couple to the receiver and to the module to download the demodulation code, wherein the demodulation code is to direct operations of the signal processor to demodulate the second information; and
   an omnidirectional antenna to couple to the receiver.

25. The system of claim 24, further comprising:
   a comparison module coupled to the receiver to compare a value of the benefit.

26. The system of claim 25, wherein the value of the benefit is associated with at least one of a network type, a network capability, a network activity level, a signal strength, a quality of service, a bandwidth, a signal-to-noise ratio, a signal-to-interference ratio, a multipath condition, a favored service provider, a monetary cost, user-preferred information, and a user-preferred service.

27. The system of claim 24, further comprising:
   a second receiver comprising the dedicated search receiver to couple the processor to the first network and to the second network.

28. The system of claim 24, wherein an information type associated with the first information is the same as an information type associated with the second information.

* * * * *